Feb. 14, 1961 H. GOLD ET AL 2,971,339
GAS TURBINE CONTROL SYSTEM
Filed Aug. 23, 1956 2 Sheets-Sheet 1

Inventor
HAROLD GOLD
DAVID M. STRAIGHT

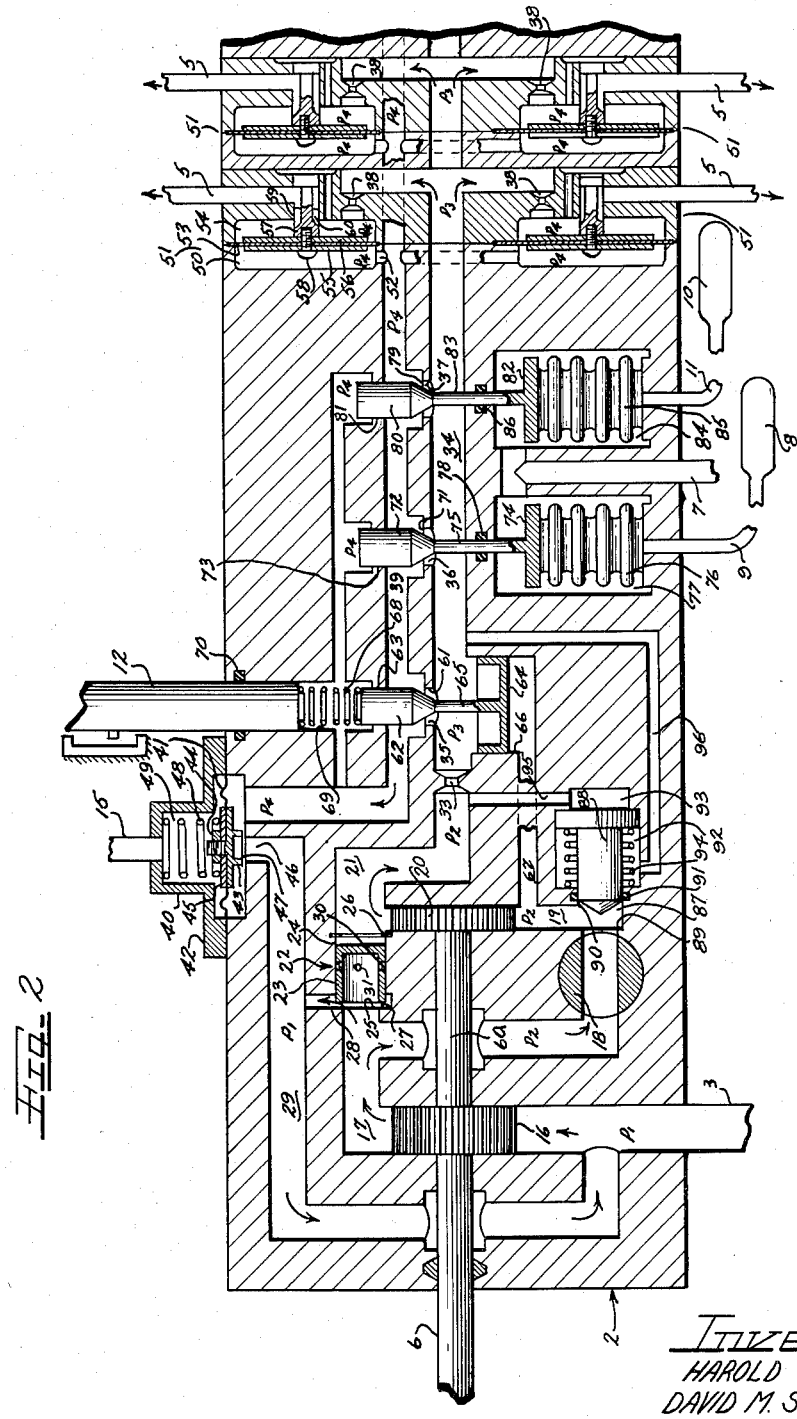

United States Patent Office

2,971,339
Patented Feb. 14, 1961

2,971,339

GAS TURBINE CONTROL SYSTEM

Harold Gold, 3645 Tolland Road, Shaker Heights 22, Ohio, and David M. Straight, 23950 Lucille Drive, North Olmsted, Ohio Filed Aug. 23, 1956, Ser. No. 605,769

3 Claims. (Cl. 60—39.28)

The present invention relates to improvements in fuel flow control systems for gas-turbine engines and the like, and more specially relates to a fuel control system for safely controlling the speed of operation of the engine.

This invention also relates to a method of regulating the rate of fuel delivery to gas-turbine engines and for automatically dividing the flow to a plurality of injection points in the engine burner system. The functions of flow regulation and flow division are obtained by mutually supporting components. Therefore, the system may be utilized for flow regulation only (single point delivery), or for the combination of flow regulation and flow division (multipoint delivery) without departing from the basic process that is herein utilized. Certain features of the present system, although useful in many environments, accommodate the differences in fuel control requirements that exist between reciprocating and gas-turbine engines.

The rotational speed of the gas-turbine engine (turbine mechanically coupled to the compressor) is very sensitive to the fuel injection rate. Because of this response of rotational speed to fuel injection rate, the method of control of rotational speed by regulation of the flow of fuel to the gas-turbine engine is widely utilized.

At a given set of operating conditions the steady running speed of the gas-turbine engine and the fixed fuel delivery rate required to obtain and hold the speed are related substantially as described by the function $W_f = KN^n$.

Where:

$W_f$—fuel flow rate
N—engine rotational speed
K—constant
$n$—varies between 2 and 3.

From this relation it follows that at a given set of operating conditions, the engine speed will be held constant if the fuel delivery rate is held constant. This method of control was employed on early engines. The important disadvantage of speed control by constant fuel delivery rate results from difficulties encountered during acceleration from low engine speeds. At low engine speeds the air flow through the engine is a fraction of the air flow at high engine speeds. Therefore, if the fuel delivery rate is suddenly increased at a low engine speed to the value required for high engine speed, the very rich fuel-air ratio may result in gas temperatures sufficiently high to destroy or damage the turbine. The system described herein provides means for limiting the rate of increase of fuel flow during acceleration to prevent engine damage. The fuel flow limiting is varied in accordance with engine rotational speed, the inlet air pressure and temperature, and in accordance with the burner inlet temperature. The last mentioned parameter is utilized to account for the energy added by regeneration. By taking into account these several parameters the control system permits substantially the maximum rate of engine acceleration that can be obtained without over-temperature.

The system described herein as illustrating the preferred embodiment of the invention, provides a highly reliable mechanism for overspeed protection and in addition provides a very simple mechanism for emergency overspeed protection. Additional emergency limiting elements can be readily added without basic modification of the system. As previously stated the system divides the flow into a plurality of streams for distribution to the plurality of injection points in the engine. This control of fuel distribution permits the use of a wide range of atomizing fuel nozzles or vaporizing mechanisms which would otherwise be unusable because of poor distribution among the points of injection. Other significant advantages of the system will be pointed out in the detailed description.

In accordance with the foregoing, it is among the objectives of our invention to provide a system for controlling the flow of fluid fuel to an engine, such as a gas-turbine and to include in the system the control of the speed of the turbine by varying the flow of fuel thereto.

Another object is to provide a fuel control system of the type described wherein the amount of fuel delivered to the turbine is automatically regulated during acceleration to prevent attaining rich fuel-air ratios which would result in gas temperatures sufficiently high to destroy or damage the turbine.

Another object of the invention is to provide a fuel flow control system wherein the parameters of engine speed, burner inlet temperature of the air entering the combustion zone and the inlet air temperature and inlet air pressure of the air entering the compressor will automatically control and limit the maximum amount of fuel which can be fed to the engine in order to limit the rate of acceleration due to a high fuel-air ratio to a degree where safe operating temperatures are maintained so as not to damage the turbine.

A still further object of the invention is to provide a fuel flow control system which takes into account the energy added by regeneration or preheating of the air entering the combustion zone in limiting and controlling the amount of fuel supplied to the combustion zone.

A further object of the invention is to provide a fuel flow control mechanism for a turbine wherein the desired speed can be entered into the mechanism as a mechanical displacement signal and the fuel flow increase will be limited in proportion to other parameters of engine operation and the flow of fuel will increase or decrease within safe limits until a stable speed condition is reached.

Another important object of the invention is to provide a fuel flow control mechanism which is provided with an emergency disablement control operative in the event of malfunction of the other fuel flow control devices.

Another object of the invention is to provide a fuel flow control mechanism with emergency overspeed protection which will automatically shut off the supply of fuel to the engine if the engine reaches excessive speeds.

Another general object of the invention is to provide a fuel flow control system and mechanism wherein additional emergency limiting elements can be added without basic modification of the system.

Other objects and advantages of the present invention will become more apparent to those skilled in the art and to those who receive a complete disclosure of the principles of the structure and methods taught by the invention as disclosed in the following specification and claims taken in connection with the accompanying drawings, in which:

Figure 2 is a cross sectional view shown partially in schematic arrangement and illustrating the control assembly;

Figure 1:
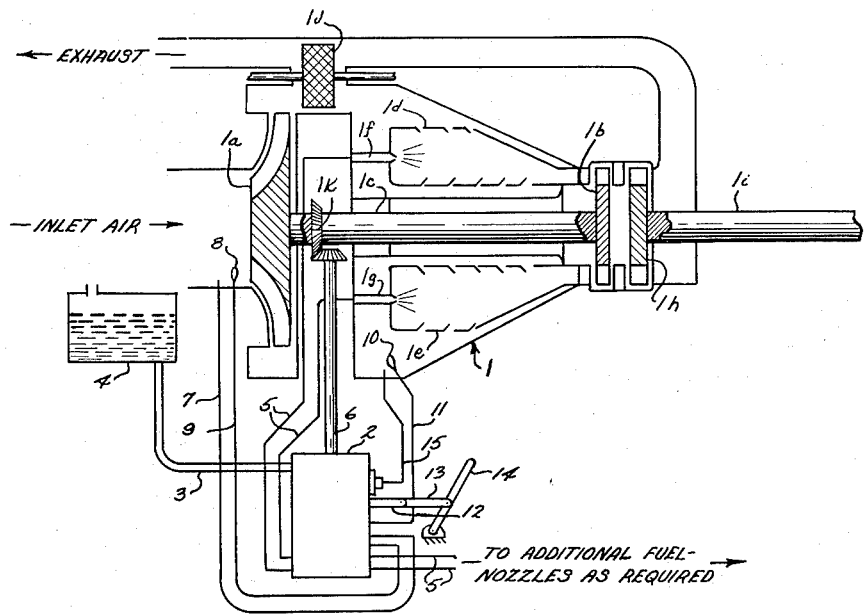
Figure 1 is a schematic diagram of a gas-turbine engine showing a general arrangement of a control system of the type disclosed in conjunction with the present invention.

The gas-turbine engine 1 illustrated in Figure 1 employs a conventional arrangement of a compressor 1a coupled to a turbine 1b through a shaft 1c. The burners 1d and 1e are located between compressor 1a and the turbine 1b. Fuel is delivered to the burners through fuel nozzles 1f and 1g. The hot, high velocity gas leaving the turbine 1b is further expanded through a power turbine 1h. Turbine 1h is coupled to shaft 1i. The useful power is delivered by the shaft 1i. In automotive use the shaft 1i is coupled to the drive wheels. In many instances of automotive use the gases leaving the power turbine 1h are directed back to a regenerator 1j. The regenerator extracts heat from the turbine exhaust and transfers the heat energy to the air entering the burners.

In Figure 1 a control assembly 2 is located in any convenient location, preferably close to the engine burners. Fuel is delivered to the control assembly at low pressure through a conduit 3 from a fuel supply tank 4. Fuel is discharged under pressure from the control assembly through discharge conduits 5. Conduits 5 carry the metered fuel to the engine fuel nozzles 1f and 1g. The rotational speed of engine shaft 1c is transmitted to the control assembly through a shaft 6. The shaft 6 is coupled to the shaft 1c through gearing 1k. The control assembly communicates with the engine-inlet-air pressure through a conduit 7. A gas or liquid filled temperature bulb 8 transmits a signal corresponding to the engine-inlet-air temperature, to the control through conduit 9. A signal corresponding to burner inlet temperature is transmitted to the control assembly by means of a temperature bulb 10 and conduit 11. The operator's input signal enters the control assembly through a rod 12. The rod 12 is coupled by a link 13 to a control input lever 14. Burner inlet pressure is transmitted to the control through a conduit 15.

In the schematic diagram of the control assembly 2, illustrated in Figure 2, the fuel entering through the conduit 3 is pumped to a relatively high pressure by a positive displacement pump rotor 16. The pump rotor 16 may be of the gear type as illustrated. From the pump 16 the fuel flows through an intermediate zone or passage 17, through a stop-cock 18 and into a passage 19. The fuel is transported by a positive displacement pump rotor 20 without a change in pressure to a passage 21. The zero pressure gradient across pump rotor 20 is automatically maintained by a control valve 22. The shaft 6 drives the rotors 16 and 20 at a fixed ratio to the rotational speed of the engine shaft 1c. The valve 22 consists of a piston 23 slidably contained in a bore 24. The piston 23 is retained in the bore 24 by an orifice 25 and a retaining ring 26. A variable flow-controlling orifice 27 is formed between the orifice 25 and the adjacent edge of the piston 23. The displacement of the rotor 16 is made larger than the displacement of the rotor 20. The excess flow from the rotor 16 is relieved through the variable orifice 27. Piston 23 moves in response to a pressure gradient across the rotor 20 thereby varying the open area of the orifice 27 to maintain the pressure gradient at substantially zero. The flow from the orifice 27 discharges into an annulus 28 and into a return conduit 29. Conduit 29 communicates with the inlet conduit 3. Conduits 17 and 19 and stop-cock 18 offer negligible resistance to fluid flow and hence the static pressure is the same at all points in the conduits. The static pressure in conduits 17 and 19 will be referred to as ($P_2$) and the pressure in conduits 29 and 3 will be referred to as ($P_1$). By virtue of the zero pressure gradient across the rotor 20 there is no leakage flow across the rotor. The flow passing into conduit 21 from rotor 20 is thereby made precisely proportional to the speed of the engine shaft 1c. Leakage by the piston 23 from the higher pressure $P_2$ in passage 21 to the lower pressure $P_1$ existing in annulus 28, is prevented by annulus 30 in piston 23. Holes 31 communicate the pressure $P_2$ to the annulus 30. The pressure gradient between annulus 30 and the end of piston 23 adjacent to conduit 21 is thereby made zero. Hence there is no leakage from conduit 21 by piston 23. Shaft 6a passes through conduit 17 at the enlarged section 32, hence there is no leakage from the rotor 20 along shaft 6a. By virtue of the zero pressure gradient across all possible leakage paths, the rate of fluid flow from the conduit 21 into the orifice 33 is precisely proportional to the rotational speed of the engine shaft 1c.

The flow from orifice 33 enters fuel conduit 34. Fuel conduit 34 communicates with valves 35, 36 and 37 and with branch flow controlling orifice 38. By virtue of negligible fluid friction in conduit 34 the upstream static pressures at valves 35, 36 and 37 and branch orifices 38 are equal and are at the value of $P_3$. The flows through valves 35, 36 and 37 discharge into a conduit 39 which is at reduced pressure. Reduced pressure conduit 39 transmits these flows into a valve assembly 40. Valve assembly 40 contains a moveable wall preferably comprising a limp diaphragm 41 clamped at its outer periphery by a housing 42. Valve element 43 is fastened to the diaphragm 41 at the center of the diaphragm by a nut 44. A plate 45, clamped between the valve element 43 and the nut 44 completes the valve and moveable wall assembly. The valve element 43 coacts with a bore 46 to form a flow controlling variable orifice 47. Bore 46 discharges into conduit 29. Variable orifice 47 is biased toward closed position by a spring 48. The spring 48 is contained in a chamber 49. The chamber 49 communicates with engine combustion chamber pressure through conduit 15 (see Figure 1). The diaphragm 41 varies the open area of the variable orifice 47 to maintain equilibrium between the opening force resulting from the pressure in conduit 39 and the closing forces resulting from the spring bias and the engine combustion chamber pressure. By virtue of this valve action, the pressure in conduit 39 is maintained at substantially a constant value higher than the engine combustion chamber pressure. The pressure in conduit 39 will be referred to as $P_4$. By virtue of negligible fluid friction in conduit 39 the static pressure is substantially the same at all points in the conduit.

The chambers 50 of control valve assemblies 51 communicate with conduit 39 through passages 52. The static pressure in the chambers 50 is therefore $P_4$. The valve assemblies 51 contain a moveable wall preferably comprising a limp diaphragm 53 clamped along the outer edge of chamber 50 and the coaxial opposite chamber 54. Diaphragm 53 is structurally supported by plates 55 and 56. The balanced valve element 57 is fastened to the diaphragm 53 at the center of the diaphragm by a screw 58. The screw 58 also secures plates 55 and 56. The valve element 57 coacts with a bore 59 to form a variable orifice 60. The variable orifice 60 is varied by the movement of the diaphragm 53 in response to pressure gradients across the diaphragm 53. By virtue of this action the pressure in chamber 54 is automatically maintained equal to the pressure in chamber 50. The static pressure in chamber 54 is therefore substantially $P_4$. The branch orifices 38 discharge into chambers 54. The variable orifices 60 and bores 59 discharge into conduits 5. Conduits 5 transmit the fuel to the engine fuel nozzles or fuel vaporizers.

As now described, the pressure gradient across valves 35, 36 and 37 is $P_3 - P_4$, and the pressure gradient across branch orifices 38 is also $P_3-P_4$. By virtue of the equal pressure drops, the flow through each of the orifices 38 is proportionally related to the flow through the valves 35, 36 and 37. From a standpoint of the hydraulics of the system, the valves 35, 36 and 37 perform as a single orifice and the branch orifices 38 perform as a single orifice. If the branch orifices 38 are made of equal areas, the flows in the conduits 5 will be maintained equal. Let the total area of the branch orifices 38 be referred to as $A_b$ and the total open area (at any instant) of valves 35, 36 and 37 be referred to as $A_r$. By virtue of the equal pressure gradients, the fuel flow to the engine $Q_b$ and the return flow (through valves 35, 36 and 37) $Q_r$ are functionally related as follows:

$$\frac{Q_r}{Q_b} = \frac{A_r}{A_b}$$

The sum of $Q_r + Q_b$ is equal to the flow passing through the orifice 33. The flow through orifice 33 is equal to the product of the displacement (D) of rotor 20 per revolution of the engine shaft 1c and the rotational speed N of the engine shaft 1c. Thus (2) $$Q_r + Q_b = DN$$

By combining these last two equations the fuel flow delivered to the engine at any instant is (3) $$Q_b = \frac{DN}{1 + \frac{A_r}{A_b}}$$

It may be seen from this last equation that when valves 35, 36 and 37 maintain $A_r$ constant, the engine flow increases linearly with the rotational speed of engine shaft 1c.

Valve 35 comprises orifice 61 and coacting valve element 62. Valve element 62 is guided in a bore 63 and is fastened to a piston 64 by a rod 65. Piston 64 operates in a bore 66. The valve element and the piston operate freely in the bores. Bore 66 opens on one side to the conduit 34. The opposite end of the bore 66 communicates with the passage 19 through the conduit 67. By virtue of the pressure regulation previously described, the pressure gradient across piston 64 is $P_2-P_3$, and hence is equal to the pressure drop across orifice 33 and is therefore proportional to the square of engine rotational speed. Obviously the same pressure gradient across the piston 64 could be obtained by having the conduit 67 communicate directly with the upstream side of orifice 33 (or the downstream side of rotor 20). The advantage derived from having the conduit 67 communicate (as drawn) with the upstream side of rotor 20, lies in the effect of leakage by the piston 64. With the system as drawn, leakage by the piston 64 does not affect the flow through the orifice 33. The flow through orifice 33 is then at all times precisely proportional to the speed of the engine shaft 1c. Therefore the pressure gradient across the piston 64 and hence the force acting to open valve 35 is precisely a function of engine shaft speed and the force is not affected by leakage by piston 64. Valve 35 is biased toward closed position by spring 68. The variation in the bias of spring 68 is obtained from the control input command. Rod 12 moves axially in response to movements of the control lever 14 (Figure 1) to adjust the spring bias. When the engine runs at a steady speed, the closing force of the spring bias is in equilibrium with the opening force that results from the pressure gradient across the piston. For a given set of external conditions the action of valve 35 will cause the engine to accelerate or decelerate to a specific rotational speed for each position of the control lever 14. Movement of rod 12 inward will cause the engine speed to increase and movement of the rod outward will cause the engine speed to decrease. The rod 12 is guided in bore 69 and passes out of the housing 2 through a seal 70. The movement of the rod 12 is limited by a projection 12a on the rod striking limiting fingers on a stop member 12b.

Valve 36 comprises an orifice 71 and valve element 72. The valve element 72 is guided in a bore 73 and is fastened to a bellows end 74 by a rod 75. A bellows 76 is fastened to the bellows end 74 by the rod 75. Bellows 76 is fastened to the end 74 and is contained in a chamber 77. The opposite end of the bellows 76 is fastened to rear wall of the chamber 77. The rod 75 passes into the chamber 77 through a seal 78. The bellows 76 communicates with the bulb 8 through the conduit 9. The bulb 8 contains a suitable fluid which expands as the temperature of the bulb 8 is raised. The bellows 76 thereby responds to changes in inlet air temperature, causing the valve 36 to move toward open as the inlet air temperature increases. Chamber 77 communicates with inlet air pressure through the conduit 7. An increase in inlet air pressure causes the bellows 76 to contract. Bellows 76 thereby causes the valve 36 to move toward closed position as the inlet air pressure increases.

The valve 37 comprises an orifice 79 and a valve element 80. The valve element 80 is guided in a bore 81 and is fastened to a bellows end 82 by a rod 83. A bellows 84 is fastened to the end 82 and is contained in a chamber 85. The opposite end of the bellows 84 is fastened to the rear wall of the chamber 85. The rod 83 passes into the chamber 85 through a seal 86. The bellows 84 communicates with the bulb 10 through the conduit 11. The bulb 10 contains a suitable fluid which expands as the temperature of the bulb 10 is raised. The bellows 84 thereby responds to changes in burner inlet temperature, causing the valve 37 to move toward open as burner inlet temperature increases. The chamber 85 communicates with inlet air pressure through the conduit 7. An increase in inlet air pressure causes the bellows 84 to contract. The bellows 84 thereby causes the valve 37 to move toward closed as the inlet air pressure increases.

Figure 3:
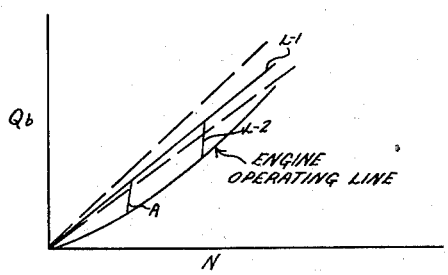
Figure 3 is a graphic presentation showing general performance characteristics of a turbine and control system of the design of the present invention.
Figure 4:
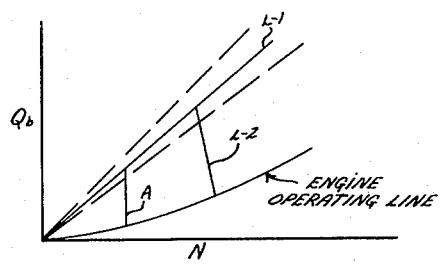
Figure 4 is another graphic presentation illustrating performance characteristics of an engine and control system under different operating circumstances.

When the engine runs at a steady speed under steady atmospheric and load conditions, valves 35, 36 and 37 remain in substantially fixed positions. If at such a condition the rod 12 is suddenly moved inward, the valve 35 will be driven closed. This will reduce the total area $A_r$ assuming the openings of valves 36 and 37 remains the same. The reduction in $A_r$ will cause the flow of fuel to the engine $Q_b$ to increase prior to the subsequent increase in engine speed. The magnitude of the initial increase in flow $Q_b$ will depend on the factors as expressed in the above equation Number 3. After the initial increase in flow $Q_b$ the engine will experience an increase in turbine inlet temperature which causes the engine speed to increase. As long as valve 35 remains closed and valves 36 and 37 remain in fixed position, it may be seen from Equation 3 that the flow to the engine, $Q_b$, will increase linearly as the engine speed increases. At some higher value of engine speed the increased differential $(P_2-P_3)$ across piston 64 causes valve 35 to reopen thereby halting the increasing flow $Q_b$ and thereby reducing the engine acceleration until the new steady running speed is reached. This process is shown graphically in Figures 3 and 4. In Figure 3 the engine is assumed to be more heavily loaded than in Figure 4, and hence the engine operating line in Figure 3 is drawn higher than in Figure 4. In all other respects the figures are identical. Consider in either figure that the engine is in steady running condition at point A. At the steady running condition the flow to the engine, $Q_b$, corresponds to the engine required flow $W_f$. When rod 12 is moved inward the flow to the engine, $Q_b$, increases to line L–1. As the engine speed increases the flow $Q_b$ increases linearly with engine speed along the line L–1. When valve 35 starts to reopen the flow $Q_b$ decreases with increasing speed along the line L–2 until $Q_b$ again corresponds to $W_f$. In Figure 4 the same process takes place but the magnitude of the initial rise in $Q_b$ is greater. The lines L-1 and L-2 of Figure 4 are the same as those of Figure 3.

The slope of line L-1 is determined by the area $A_r$ that remains when valve 35 is driven closed. When the inlet air temperature increases or when the inlet air pressure decreases, the flow of air decreases. When this occurs valve 36, and to a lesser extent valve 37, are caused to take a position of greater open area and thus the slope of the line L-1 is reduced. Thus the reduction in engine air flow is taken into account to prevent the excessive turbine inlet temperatures that could otherwise occur during accelerations under varying atmospheric conditions.

The heat energy added by the regenerator will vary with engine loading. When the energy added is large it is necessary to reduce the quantity of fuel added during acceleration to prevent excessively high turbine temperatures. Valve 37 increases its open area when burner inlet temperature increases. The slope of the line L-1 is thereby reduced as more heat energy is added by the regenerator. The various characteristic slopes of the line L-1 are shown as dashed lines in Figures 3 and 4.

When the rod 12 is suddenly withdrawn from the housing 2 valve 35 opens to a predetermined maximum area. The amount of the initial reduction and the reduction with engine speed of $Q_b$ is therefore limited in the same manner as was the increase during accelerations. This action prevents loss of combustion during sudden decelerations of the engine.

The danger of destruction of the gas turbine engine due to excess rotational speed is so great that it is generally considered necessary to incorporate automatic speed limiters that can override the operator's command. In this device as in all other governor type controls, the maximum speed can be limited by means of a physical stop on the spring biasing lever. In this case a stop can be provided on the maximum possible insertion of rod 12 in housing 2. This method of over-speed protection is only effective as long as valve 35 functions properly. In the event of failure of valve 35 an emergency valve 87 is activated to override the entire system.

Valve 87 comprises a valve element and an integral piston 88. The valve element 88 coacts with an orifice 89 for shutoff. Valve element 88 passes through a guide bore 90 and a seal 91 into a passage 19. The integral piston of valve element 88 is housed in a bore 92 and is biased against a reduced bore 93 by a spring 94. The pressure upstream of orifice 33 ($P_2$) communicates with the bore 93 through a conduit 95. The piston bore 92 communicates with the pressure downstream of orifice 33 ($P_3$) through a passage 96. The pressure $P_2$ also acts on the end of the valve element 88 in the passage 19. The piston area exposed to the bore 93 is made greater than the area of the valve element 88 in the passage 19. Thus $P_2$ acts to close the valve 87. The spring 94 biases valve 87 open until a predetermined pressure difference $P_2-P_3$ is reached. This occurs at a predetermined speed independently of the position of the various valves 35, 36, or 37. When piston 88 moves off the shoulder formed between bore 92 and 93 the piston area exposed to the pressure $P_2$ increases. This effect causes valve element 88 to move very rapidly to closed position. In the closed position of valve 87 the entire flow to the engine is cut off.

Emergency or shut-down fuel cut-off can also be performed by the operator by rotation of the stop-cock 18. When either valve 87 or the stop-cock 18 are closed and the momentum of the engine causes shaft 6 to rotate, the entire flow from the rotor 16 is automatically by-passed through the valve 22.

Other emergency cut off means similar to stop-cock 18 can be provided if necessary. Other fuel flow limiting means can be added by adding valves similar to 36 and 37.

Although the operation of the control system will be clear from the foregoing description of the method and mechanism utilized to obtain the flow control to the burner zone of the turbine, a summary of the operation of the control will be helpful in considering the advantages of the invention. With reference principally to Figure 2, the fuel is delivered to the control assembly by being drawn through a conduit 3 from a fuel supply tank 4. The fuel is pumped through a pump assembly to the fuel conduit 34. The fuel conduit 34 connects to a flow controlling orifice 38 which passes fuel in accordance with the pressure differential between the fuel conduit 34 and a conduit of reduced pressure 39. The pump unit consists of a first rotor 16 which delivers to an intermediate zone or passage 17 to a second rotor 20. The pressure gradient across pump rotor 20 is maintained at zero by a control valve 22 and the delivery of rotor 16 is greater than the delivery of rotor 20, with the excess fuel being returned through annulus 28 and into the return conduit 29.

The rotor 20 delivers fuel in direct proportion to the speed of the engine and the fuel passes through an orifice 33 which leads into the fuel conduit. The pressure gradient from the fuel conduit 34 to the conduit of reduced pressure 39 is controlled by the flow diversion paths consisting of the valves 35, 36 and 37. The opening of valve 35 is influenced by the control input member 12, and the opening of valves 36 and 37 is controlled by the parameters of inlet air pressure, inlet air temperature and burner inlet temperature. The pressure of the fuel in the conduit of reduced pressure 39 is controlled by the valve element 43, which reflects the parameter of burner pressure. Thus, the flow of fuel through the flow controlling orifice 38, which varies as the pressure differential between fuel conduits 34 and 39, is controlled by the two control input speed signals (speed of pump 20 and position of shaft 12) and by the signals reflecting the factors of burner inlet pressure, burner inlet temperature, inlet air pressure and inlet temperature.

When the mechanical control input signal is placed in the system by movement of the rod 12, the speed control valve 35 is influenced by the piston 64 which communicates on opposing sides to the pressure $P_3$ of the fuel conduit and the pressure $P_2$ on the inlet side of the pump rotor 20. This influencing factor and the positioning of the speed control valve 35 enables the factors representing the parameters heretofore referred to, to prevent an excessive amount of fuel to be fed to the combustion zone to cause overheating and possible damage to the turbine blades. On an accelerating signal, after the turbine picks up speed, the speed control valve will reach a stable position when equilibrium is reached between the bias of spring 68 and the pressures influencing piston 64.

A safety control valve 87 is provided which communicates through conduit 96 to the downstream pressure $P_3$ of the orifice 33 and through conduit 95 to the upstream pressure $P_2$ of the orifice 33. When the speed of the engine reaches a point where the pressure differential ($P_2-P_3$) across the orifice 33 reaches a certain point, the valve 87 will move to the left and shut off the fuel supply to the pump rotor 20. This valve therefore acts as a safety valve preventing the engine from reaching the excessive runaway speeds.

Thus it will be seen that we have provided an improved fuel flow control mechanism which is capable of use with an engine, such as a gas turbine, in order to control the speed thereof by variation in fuel quantity supply. The speed control is entered into the machine as a simple mechanical signal and the machine automatically functions to prevent an increase in fuel supply to a degree wherein over-heating and possible damage to the turbine would result. The fuel flow control is operative to prevent an over-increase of fuel supply and controls the supply in accordance with factors representing the parameters of engine speed, burner inlet temperature, inlet air temperature and inlet air pressure. The design of the system is such that controls responsive to other factors may be readily used without alteration of the basic system.

In addition to safeguarding the engine during acceleration, the fuel flow control system will automatically prevent overspeeding of the engine and possible damage to the engine parts and to operating personnel. When the speed of the engine reaches a certain degree, the supply of fuel thereto will be automatically and positively shut off preventing any further acceleration, and preventing any further maintenance of the dangerous high speed.

We have, in the drawings and specification, presented a detailed disclosure of the preferred embodiments of our invention, but it is to be understood that we do not intend to limit the invention to the specific form disclosed but intend to cover all modifications, changes and alternative constructions and methods falling within the scope of the principles taught by our invention.

We claim as our invention:

1. A fuel supply system for an internal combustion engine comprising a fuel conduit leading to a combustion zone, engine driven fuel pump means delivering fuel to said conduit at a rate varying in accordance with engine speed, said pump means including a first pump unit receiving fuel from a source and delivering the fuel to an intermediate pressure zone, and a second pump unit receiving fuel from said intermediate pressure zone and delivering fuel to said fuel conduit, pressure equalizing means between the fuel conduit and the intermediate zone including a controlled outlet passageway from the intermediate zone to said fuel source and permitting flow through said passageway to maintain a zero pressure gradient across said second pump to insure that there will be no leakage flow across the second pump unit whereby the fuel flow is in exact proportion to the rate of operation of the pump means, and valve means positioned in said intermediate zone downstream of said pressure equalizing means to positively stop the flow of fuel to the second pump unit under emergency conditions and cause the fuel to flow back to said fuel source, said pressure equalizing means opening said passageway in response to closing of said valve means.

2. A mechanism for controlling the speed of a gas turbine engine through variation of fuel flow rate to the combustion zone of the engine comprising an engine driven positive displacement pump operating at a speed proportional to the speed of the turbine, pressurizing means and valve means connected to automatically maintain the pressure gradient across said engine driven pump at zero, a fuel conduit connected to receive the flow delivered by said engine driven pump, an orifice at the inlet to said fuel conduit, a control conduit of lower pressure than said fuel conduit, a speed control diversion valve downstream of said orifice for diverting flow from said fuel conduit to said control conduit, said diversion valve urged toward open position by the pressure gradient across said orifice, an external force biasing the diversion valve toward closed position, a discharge orifice for controlling the flow from said fuel conduit to the combustion zone of the engine in accordance with pressures in said fuel and control conduits, auxiliary diversion valves in said fuel conduit in parallel relation with first said diversion valve, and means automatically adjusting said auxiliary diversion valves in response to parameters reflecting operational limits of the engine, said auxiliary valves creating an auxiliary flow between said conduits and preventing excessive engine speeds or stopping of the engine when the said speed control diversion valve is driven full open or full closed.

3. A mechanism for controlling the speed of a machine comprising a liquid supply means, means for pressurizing the liquid, a positive displacement pump operating at a speed proportional to the speed of the machine, valve means operating in conjunction with said pressurizing means to maintain the pressure gradient across said pump at zero, a conduit for receiving the flow from said pump, an orifice at the inlet to said conduit, means for controlling the pressure in said conduit, a member defining a bore and having a piston operating freely in said bore, one side of said piston communicating with said conduit downstream of said orifice and the opposite side of said piston communicating with the inlet to said pump, said piston thereby responsive to the pressure gradient across said orifice, external force means acting on said piston to balance the force resulting from said pressure gradient, and means actuated by said piston to adjust the speed of said machine.

References Cited in the file of this patent

UNITED STATES PATENTS

| | | |
|---|---|---|
| 2,405,888 | Holley | Aug. 13, 1946 |
| 2,422,808 | Stokes | June 24, 1947 |
| 2,446,523 | Bradbury et al. | Aug. 10, 1948 |
| 2,474,033 | Chamberlin et al. | June 21, 1949 |
| 2,503,048 | Ifield | Apr. 4, 1950 |
| 2,508,260 | Holley | May 16, 1950 |
| 2,604,756 | Greenland | July 29, 1952 |
| 2,606,066 | Thompson | Aug. 5, 1952 |
| 2,618,324 | Jordan | Nov. 18, 1952 |
| 2,631,430 | Staley et al. | Mar. 17, 1953 |
| 2,632,298 | Willgoos | Mar. 24, 1953 |
| 2,644,513 | Mock | July 7, 1953 |
| 2,658,566 | Wirth et al. | Nov. 10, 1953 |
| 2,671,860 | Bevins | Mar. 9, 1954 |
| 2,673,556 | Reggio | Mar. 30, 1954 |
| 2,674,847 | Davies et al. | Apr. 13, 1954 |
| 2,709,893 | Birmann | June 7, 1955 |
| 2,741,089 | Jagger | Apr. 10, 1956 |